US010739835B2

(12) United States Patent
Gutierrez-Vazquez et al.

(10) Patent No.: US 10,739,835 B2
(45) Date of Patent: Aug. 11, 2020

(54) POWER MANAGEMENT FOR ELECTRONIC DEVICES

(71) Applicants: HEWLETT-PACKARD DEVELOPMENT COMPANY, L.P., Houston, TX (US); Purdue Research Foundation, West Lafayette, IN (US)

(72) Inventors: Hernan Ildefonso Gutierrez-Vazquez, Boise, ID (US); Mark J. Wibbels, Boise, ID (US); Jan Allebach, West Lafayette, IN (US); Perry Victor Lea, Boise, ID (US); Ganesh Prahlad Rao Gingade, West Lafayette, IN (US); Wenyi Chen, West Lafayette, IN (US); Yung-Hsiang Lu, West Lafayette, IN (US)

(73) Assignees: Hewlett-Packard Development Company, L.P., Spring, TX (US); Purdue Research Foundation, West Lafayette, IN (US)

( * ) Notice: Subject to any disclaimer, the term of this patent is extended or adjusted under 35 U.S.C. 154(b) by 249 days.

(21) Appl. No.: 15/778,578

(22) PCT Filed: Jul. 23, 2015

(86) PCT No.: PCT/US2015/041752
§ 371 (c)(1),
(2) Date: May 23, 2018

(87) PCT Pub. No.: WO2017/014786
PCT Pub. Date: Jan. 26, 2017

(65) Prior Publication Data
US 2018/0356871 A1 Dec. 13, 2018

(51) Int. Cl.
G06F 1/3228 (2019.01)
G06F 1/3231 (2019.01)

(52) U.S. Cl.
CPC .......... *G06F 1/3228* (2013.01); *G06F 1/3231* (2013.01)

(58) Field of Classification Search
CPC .............................. G06F 1/3228; G06F 1/3231
(Continued)

(56) References Cited

U.S. PATENT DOCUMENTS 5,396,635 A * 3/1995 Fung ..................... G06F 1/3203
713/323
5,452,277 A * 9/1995 Bajorek ................ G06F 1/3215
369/53.18
(Continued)

FOREIGN PATENT DOCUMENTS

EP 1978765 10/2008
EP 2736242 5/2014

OTHER PUBLICATIONS

Allebach, et al. Hybrid Power Management for Office Equipment. Purdue University. School of Electrical and Computer Engineering. Apr. 2015.
(Continued)

Primary Examiner — Paul R. Myers
(74) Attorney, Agent, or Firm — Fabian VanCott

(57) ABSTRACT

In one example in accordance with the present disclosure a method of is described. According to the method, usage data for an electronic device is obtained. An activity phase from a plurality of activity phases for the electronic device is selected based on the usage data. An activity phase has a corresponding timeout period and is defined by an inter-arrival threshold. The electronic device is instructed to enter a low power mode after being inactive for a time period at least as great as the timeout period corresponding to a selected activity phase.

20 Claims, 7 Drawing Sheets

(58) Field of Classification Search
USPC .................................................. 713/300–340
See application file for complete search history.

(56) References Cited

U.S. PATENT DOCUMENTS

| | | | | |
|---|---|---|---|---|
| 5,719,800 | A * | 2/1998 | Mittal | G06F 1/32 713/321 |
| 6,243,548 | B1 | 6/2001 | Hebert et al. | |
| 6,457,132 | B1 * | 9/2002 | Borgendale | G06F 1/3203 713/320 |
| 7,228,441 | B2 * | 6/2007 | Fung | G06F 1/3203 713/300 |
| 7,743,267 | B2 | 6/2010 | Snyder et al. | |
| 8,145,931 | B2 | 3/2012 | Vojak et al. | |
| 8,230,248 | B2 | 7/2012 | Dance et al. | |
| 8,346,933 | B2 * | 1/2013 | Kawato | G06F 9/455 709/222 |
| 8,432,561 | B2 | 4/2013 | Ebisui et al. | |
| 8,447,195 | B2 | 5/2013 | Motoyama | |
| 8,521,855 | B2 * | 8/2013 | Lim | G06F 1/3203 709/223 |
| 9,244,518 | B2 * | 1/2016 | Andreoli | G06F 1/3228 |
| 2005/0108582 | A1 * | 5/2005 | Fung | G06F 1/3203 713/300 |
| 2007/0223028 | A1 * | 9/2007 | Boyes, Jr. | G03G 15/5004 358/1.14 |
| 2008/0181127 | A1 * | 7/2008 | Terry | H04W 52/0212 370/252 |
| 2011/0142060 | A1 | 6/2011 | Manral | |
| 2012/0023352 | A1 | 1/2012 | Cumming et al. | |
| 2012/0110352 | A1 * | 5/2012 | Branover | G06F 1/206 713/300 |
| 2014/0157026 | A1 * | 6/2014 | So | G06F 1/3206 713/323 |
| 2014/0181552 | A1 | 6/2014 | Andreoli et al. | |
| 2014/0211676 | A1 * | 7/2014 | Chhabra | H04W 76/38 370/311 |

OTHER PUBLICATIONS

Ciriza, et al. A statistical model for optimizing power consumption of printers. Xerox Research Centre Europe.

* cited by examiner

POWER MANAGEMENT FOR ELECTRONIC DEVICES

BACKGROUND

Electronic devices, such as printers, copiers, scanners, and fax machines are being used more and more in residential and business contexts. Such electronic devices draw electrical power to provide the intended function of the particular device. As electronic devices are used more and more in society, so does the total energy consumption of such electronic devices increase. Enhanced power management strategies for these electronic devices may lead to more responsible energy usage.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
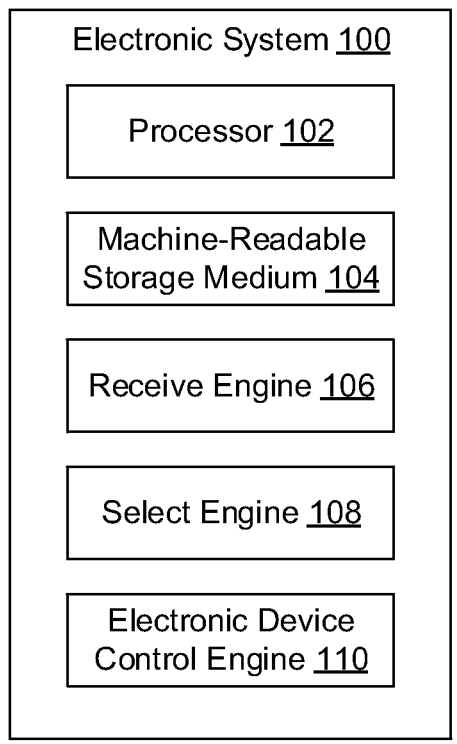
FIG. 1 is a diagram of a system for managing power of an electronic device, according to one example of the principles described herein.

As the use of electronic devices, such as printers, copiers, scanners, and fax machines continues to expand and become ubiquitous in society, user expectation may also increase such that electronic devices are expected to immediately perform an intended function. While in this immediately available "ready" mode, these electronic devices can consume large amounts of energy, especially if maintained in a ready mode for extended periods of time, such as a workday. However, despite being in a ready mode, such devices may go unused for large portions of time. To address this scenario, some power management strategies put an electronic device in a low power mode when the electronic device has been in an idle, or unused, state for a certain amount of time.

Accordingly, for a given period of time, such as a business workday, an electronic device may switch between a ready mode and a low power mode multiple times. Switching between these modes consumes a large amount of energy relative to the normal energy consumption of the electronic device and also increases the delay between the period when the electronic device is activated and carries out an intended function; which delay may reduce customer satisfaction. Moreover, such timeout-based strategies can be inefficient as setting the timeout duration can be difficult. For example, a longer timeout duration, while being more available for operation, increases power consumption as an electronic device is in a "ready" mode for a longer period of time. By comparison, a shorter timeout duration, which may reduce power consumption, is more likely to result in a delay from waking up a sleeping device. Moreover, a shorter timeout duration impacts productivity by increasing the number of times an electronic device is in a sleep state, which may consume more power as waking up from a low power mode consumes large amounts of energy. In other words, electronic device power management is a balance between the conflicting goals satisfying customer demands for quick function execution and energy-efficiency.

The systems and methods of the present specification and appended claims may address this and other issues. Specifically, the present application describes methods that may allow for reducing the power consumption of an electronic device while providing a short response period for execution of a function. Specifically, the method describes observing usage information for electronic devices and adapting power based on a wakeup delay constraint.

In one example, a plurality of activity phases for an electronic device are established, each activity phase having a different timeout period. An activity phase is a delineation of a state of an electronic device based on an inter-arrival threshold. For example, an electronic device may have multiple activity phases ranging from busiest to least busy, adjacent activity phases being divided by inter-arrival thresholds. Usage data for an electronic device is collected and an activity phase of the electronic device is selected. After the timeout period associated with the selected activity phase has expired, the electronic device is placed in a low power mode. Such graduated timeout periods may allow for more efficient use of an electronic device by increasing the flexibility of the power management strategy. Still further, this multi-phase power management strategy may be one of multiple strategies available to manage the power consumption of an electronic device. Accordingly, the method of the present specification may also select from among multiple power management strategies, a strategy that results in the most efficient use of power while maintaining a satisfactory delay period.

The present specification describes a method for managing power of an electronic device. According to the method, usage data for an electronic device is obtained. Based on the usage data, an activity phase from a plurality of activity phases is selected for the electronic device. An activity phase has a corresponding timeout period. The activity phase is also defined by a number of inter-arrival thresholds. The electronic device is instructed to enter a low power mode after being inactive for a time period at least as great as the timeout period corresponding to a selected activity phase.

The present specification describes a system for managing power of an electronic device. The system includes a processor and memory communicatively coupled to the processor. The system includes a receive engine to obtain usage data for an electronic device and a select engine to dynamically select, from a variable set of activity phases, a first activity phase for the electronic device by comparing the usage data to inter-arrival thresholds for each activity phase of the variable set of activity phases. Each activity phase has corresponding inter-arrival thresholds and timeout periods. Each activity phase is also defined by a load. A timeout period for an activity phase defined by a heavier load is longer than a timeout period for an activity phase defined by a lighter load. The select engine also determines whether to switch from the first activity phase to a second activity phase for the electronic device by comparing updated usage data to the inter-arrival threshold for each activity phase of the variable set of activity phases. The system further includes an electronic device control engine to instruct the electronic device to enter a first low power mode based on an expiration of a first timeout period associated with the first activity phase and to instruct the electronic device to enter a second low power mode based on an expiration of a second timeout period associated with the second activity phase.

The present specification also describes a system for managing power of an electronic device. The system includes a processor and memory communicatively coupled to the processor. The system also includes a receive engine to obtain usage data for an electronic device, a select engine to select from a set of candidate power management policies for the system, a power management policy to be applied to the system, and a system control engine to instruct the system to enter a low power mode based on the power management policy.

Certain examples of the present disclosure are directed to a system and method for managing power of an electronic device that allows for 1) providing an enhanced balance between power conservation and performance; 2) implementation with minimal user involvement; and 3) increasing flexibility in power management. However, it is contemplated that the devices and methods disclosed herein may prove useful in addressing other deficiencies in a number of technical areas. Therefore the systems and devices disclosed herein should not be construed as addressing just the particular elements or deficiencies discussed herein.

As used in the present specification and in the appended claims, the term "timeout period" and similar terminology refers to a period of time after which an electronic device is instructed to enter a low power mode.

Still further, as used in the present specification and in the appended claims, the term "inter-arrival" and similar terminology refers to a period of time between the arrival of requests to use an electronic device. For example, the inter-arrival time of a printer may be the time period between requests to execute a print operation.

Still further, as used in the present specification and in the appended claims, the term "activity phase" refers to a delineation of a state of an electronic device based on an inter-arrival threshold. For example, an electronic device may have multiple activity phases ranging from busiest to least busy, adjacent activity phases being divided by inter-arrival thresholds.

Still further, as used in the present specification and in the appended claims, the term "selection criteria" refers to criteria used to select upper and lower bound inter-arrival thresholds for a particular activity phase and a timeout period for a particular activity phase. Such selection criteria may include a time of the day, a day of the week, whether the particular day is a holiday, a number of activity phases, a historic usage of the electronic device, a wakeup constraint, operating parameters of the electronic device, and a desired power consumption value among other selection criteria.

Still further, as used in the present specification and in the appended claims, the term "power management policy" refers to an overall strategy for managing power to an electronic device. Examples of such policies include a static timeout management policy, an adaptive timeout management policy, and a predictive timeout management policy.

As one specific example, a multi-phase power management policy is one of the power management policies.

Even further, as used in the present specification and in the appended claims, the term "a number of" or similar language is meant to be understood broadly as any positive number including 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language indicates that a particular feature, structure, or characteristic described in connection with that example is included as described, but may not be included in other examples.

Turning now to the figures, FIG. 1 is a diagram of an electronic system (100) for managing power of an electronic device, according to one example of the principles described herein. In some examples, the electronic system (100) is part of the electronic device while in other examples, the electronic system (100) is separate from the electronic device such that the electronic device power management strategy is controlled remotely. While specific reference in the present specification is made to a laser printer; an electronic device may be any device that is capable of executing data processing operations. Examples of electronic devices include laptop computers, personal digital assistants (PDAs), mobile devices, notebooks, tablets, gaming systems, smartphones, mobile devices, printers such as laser printers, copiers, scanners, fax machines and other electronic devices. In some examples, a printer may be a two-dimensional printer or a three-dimensional printer that prints on a bed of build material.

To achieve its desired functionality, the electronic system (100) includes various hardware components. Specifically, the electronic system (100) includes a processor (102) and memory such as a machine-readable storage medium (104) storing computer program code. Although the following descriptions refer to a single processor (102) and a single machine-readable storage medium (104), the descriptions may also apply to an electronic device (100) with multiple processors and multiple machine-readable storage mediums. In such examples, the instructions may be distributed (e.g., stored) across multiple machine-readable storage mediums and the instructions may be distributed (e.g., executed by) across multiple processors.

The processor (102) may include the hardware architecture to retrieve executable code from the machine-readable storage medium (104) and execute the executable code. For example, the processor (102) may be a number of central processing units (CPUs), microprocessors, and/or other hardware devices suitable for retrieval and execution of instructions stored in machine-readable storage medium (104). The executable code may, when executed by the processor (102), cause the processor (102) to implement at least the functionality of power management for an electronic device. In the course of executing code, the processor (102) may receive input from and provide output to a number of the remaining hardware units.

Figure 2:
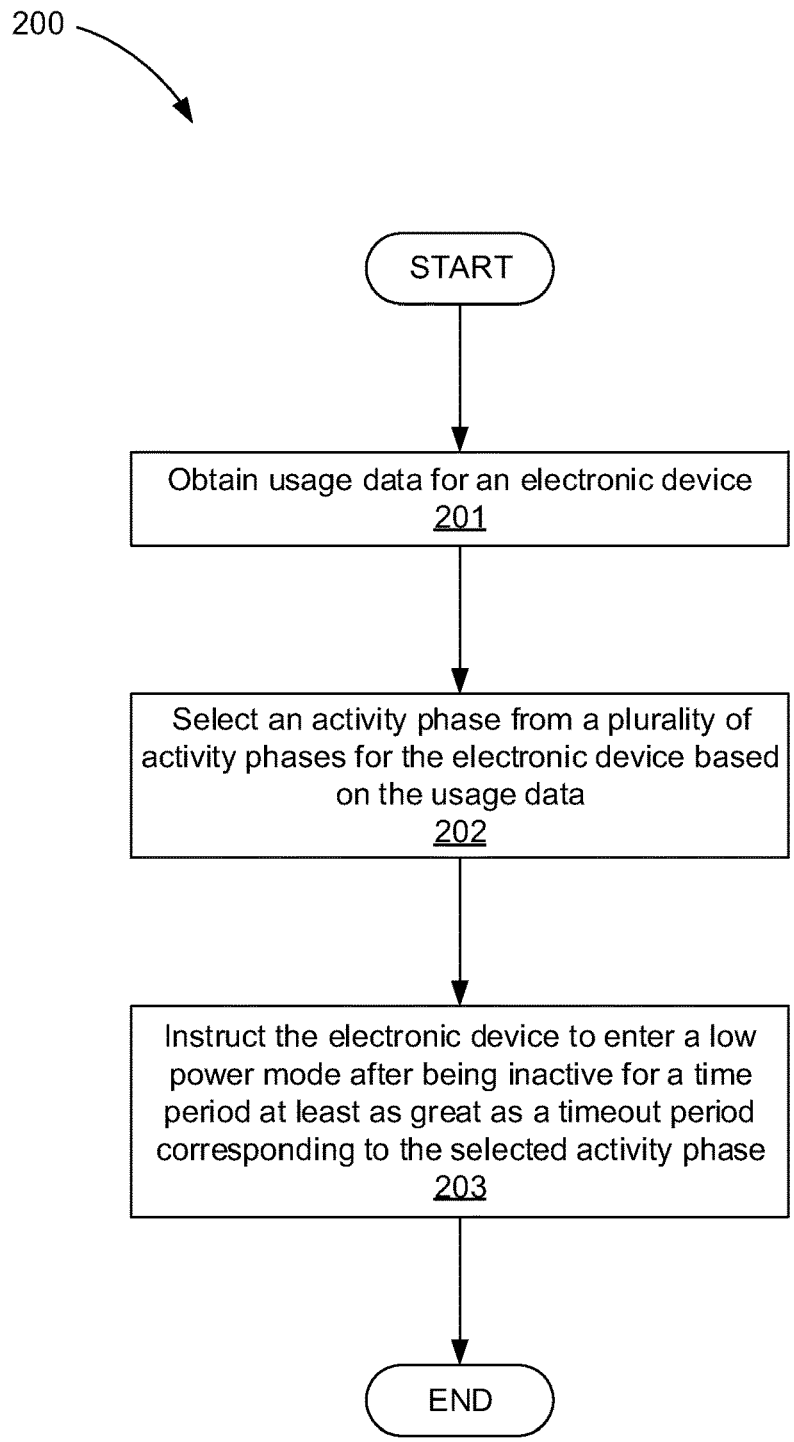
FIG. 2 is a flowchart of a method for managing power of an electronic device, according to one example of the principles described herein.
Figure 5:
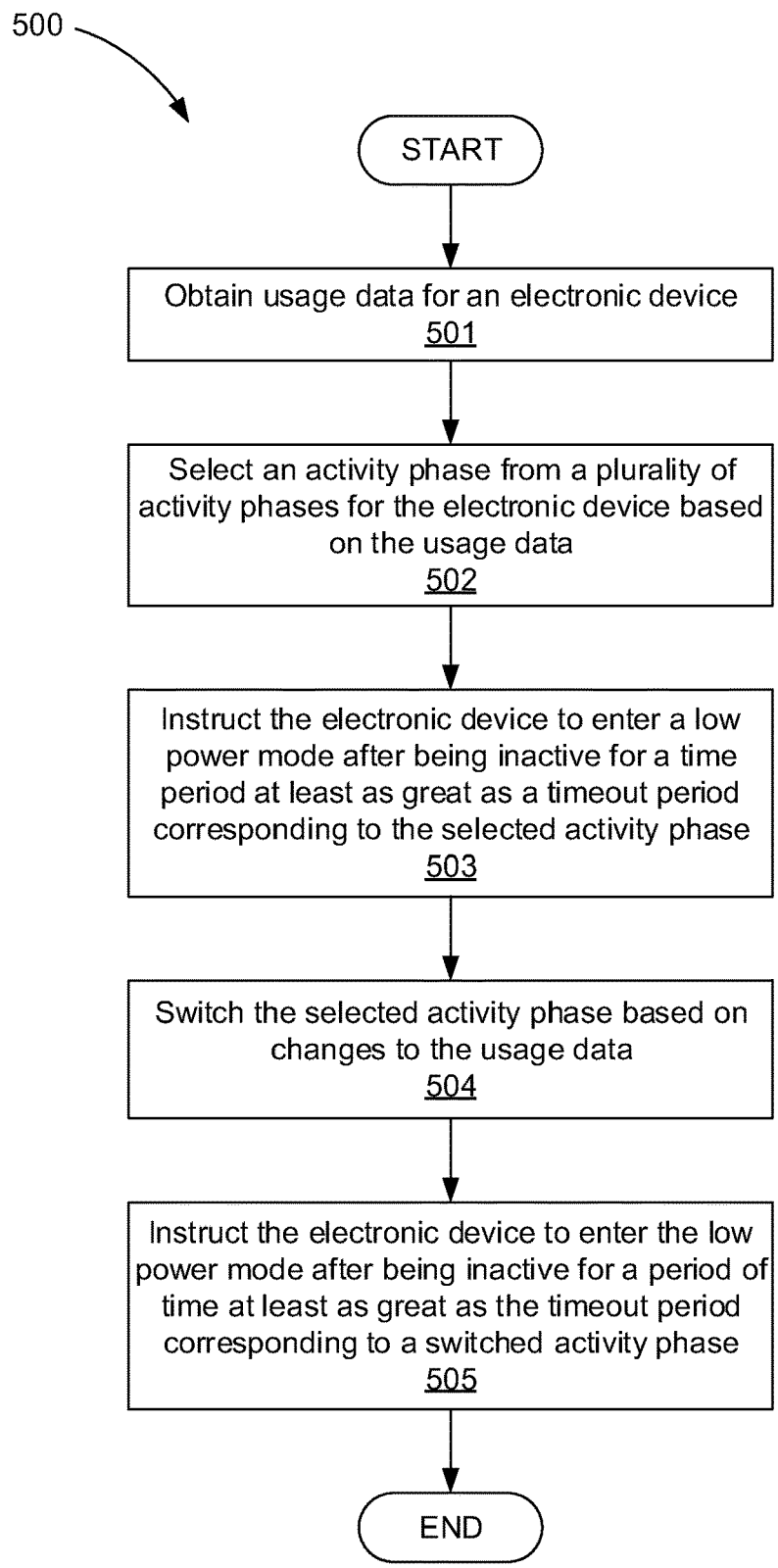
FIG. 5 is a flowchart of a method for managing power of an electronic device, according to another example of the principles described herein.

In the electronic device (100), the processor (102) may fetch, decode, and execute instructions to execute the methods described in FIGS. 2 and 5. As an alternative or in addition to retrieving and executing instructions, the processor (102) may include a number of electronic circuits comprising a number of electronic components for performing the functionality of a number of the instructions in the machine-readable storage medium (104).

The machine-readable storage medium (104) may store data such as executable program code that is executed by the processor (102) or other processing device. As will be discussed, the machine-readable storage medium (104) may specifically store computer code representing a number of applications that the processor (102) executes to implement at least the functionality described herein.

The machine-readable storage medium (104) represents generally any memory capable of storing data such as programmed instructions or data structures used by the electronic device (100). The machine-readable storage medium (104) includes a machine-readable storage medium that contains machine-readable program code to cause tasks to be executed by the processor (102). The machine-readable storage medium (104) may be tangible and/or non-transitory storage medium. The machine-readable storage medium (104) may be any appropriate storage medium that is not a transmission storage medium. The machine-readable storage medium (104) may include various types of memory modules, including volatile and nonvolatile memory. For example, the machine-readable storage medium (104) of the present example includes Random Access Memory (RAM), Read Only Memory (ROM), and Hard Disk Drive (HDD) memory. Many other types of memory may also be utilized, and the present specification contemplates the use of many varying type(s) of machine-readable storage medium (104) as may suit a particular application of the principles described herein. In certain examples, different types of machine-readable storage medium (104) may be used for different data storage needs. For example, in certain examples the processor (102) may boot from Read Only Memory (ROM), maintain nonvolatile storage in the Hard Disk Drive (HDD) memory, and execute program code stored in Random Access Memory (RAM).

The machine-readable storage medium (104) may include a machine-readable medium, a machine-readable storage medium, or a non-transitory machine-readable medium, among others. For example, the machine-readable storage medium (104) may be, an electronic, magnetic, optical, electromagnetic, infrared, or semiconductor system, apparatus, or device, or any suitable combination of the foregoing. More specific examples of the machine-readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store computer usable program code for use by or in connection with an instruction execution system, apparatus, or device. In another example, a machine-readable storage medium may be any non-transitory medium that can contain, or store a program for use by or in connection with an instruction execution system, apparatus, or device.

The machine-readable storage medium (104) may be disposed within the electronic system (100), as shown in FIG. 1. In this situation, the executable instructions may be "installed" on the electronic system (100). Alternatively, the machine-readable storage medium (104) may be a portable, external or remote storage medium, for example, that allows the electronic system (100) to download the instructions from the portable/external/remote storage medium. In this situation, the executable instructions may be part of an "installation package". As described herein, the machine-readable storage medium (104) may be encoded with executable instructions for power management of an electronic device.

In some examples, the processor (102) and machine-readable storage medium (104) are located within the same physical component, such as a server, or a network component. The machine-readable storage medium (104) may be part of the physical component's main memory, caches, registers, non-volatile memory, or elsewhere in the physical component's memory hierarchy. Alternatively, the machine-readable storage medium (104) may be in communication with the processor (102) over a network. Thus, the electronic system (100) may be implemented on a user device, on a server, on a collection of servers, or combinations thereof.

The electronic system (100) may include a number of engines (106, 108, 110). The engines depicted in the figures of the present specification may include hardware or a combination of hardware and program instructions to perform a designated function. The engines may be hardware. For example, the engines may be implemented in the form of electronic circuitry. Each of the engines may include its own processor, but at least one processor may be used by all the engines. For example, each of the engines may include a processor and memory. Alternatively, one processor may execute the designated function of each of the engines.

The receive engine (106) obtains usage data for the electronic device. The usage data may indicate a load placed on the electronic device. For example, the usage data may indicate how many users are accessing the electronic device and for what periods of time. Specifically, the usage data may indicate how far apart requests to use the electronic device are received. In a specific example, if the electronic device is a printer, the usage data may indicate that the printer is used by a certain number of users and that requests are received every 30 seconds, for example.

The select engine (108) of the electronic system (100) dynamically selects from a variable set of activity phases, a first activity phase for the electronic device. In some examples, the activity phase is selected based on the time of operation compared to a determined activity phase schedule. An activity phase refers to a state of the electronic device based on its usage. For example, an electronic device that is more heavily used for a given period of time may be in a "busy" activity phase while that same electronic device, in a time period when it is less utilized, may be in a "less busy" activity phase. In other words, an activity phase may indicate a load placed on a particular electronic device. The activity phases may be defined based on inter-arrival thresholds, specifically an upper-bound threshold and a lower-bound threshold. For example, the busiest activity phase may indicate that electronic devices that are receiving requests within 30 seconds of each other is indicated as being "busiest," whereas when that same electronic device is receiving requests within 1 minute of each other, it may be "less busy." Accordingly, an activity phase may be selected by comparing the usage data of the electronic device, which may include the actual inter-arrival values for a particular time period, with the inter-arrival thresholds of the various activity phases.

Each activity phase may also have a corresponding timeout period, with the more busy activity phases having a longer timeout period. A longer timeout period for a busier activity phase may be desirable, for example, to afford quick and efficient responses to requests in time periods (i.e., busy periods) when the demand on the electronic device is the greatest, or when it s most likely that a request to use the electronic device is to occur.

As described above, the activity phase that is selected is a part of a variable set of activity phases. A variable set of activity phases is a set of activity phases that varies in at least one characteristic. For example, the variable set may vary with regards to the number of activity phases within the plurality. For example, during busier times of the day, such as during normal business hours, there may be more activity phases in the variable set to provide a finer granularity, which increases the efficiency of the electronic system (100). By comparison during weekends, holidays, or during after hours, there may be fewer activity phases to increase power savings.

The variable set may also vary with regards to the inter-arrival thresholds and timeout periods for the various activity phases. For example, as described above, the inter-arrival thresholds and timeout periods may be selected based on selection criteria. As those criteria change, i.e., different hour of the day, different day of the week, holiday, etc., the inter-arrival threshold and timeout period may also change to as to strike an efficient balance between power consumption and wakeup delay.

In addition to selecting a particular activity phase, the select engine (108) may also determine whether to switch from a first activity phase to a second activity phase by comparing the dynamic usage data with the inter-arrival thresholds. An example is given as follows. In this example, an electronic device is in a busiest stage due to the inter-arrival value for the electronic device being between upper and lower bound inter-arrival thresholds for a busiest activity phase. In this example, the inter-arrival value for the electronic device may increase due to fewer requests being received by the electronic device. If the inter-arrival value changes such that the inter-arrival value is greater than an upper-bound threshold for the busiest activity phase, the select engine (108) may switch the activity phase to a less busy activity phase.

Implementing multiple activity phases each with a corresponding and distinct timeout period may allow for increased flexibility in tailoring a power management strategy based on actual usage of the electronic device. For example, timeout periods are decreased when it is less likely that a request will be received, thus conserving power; also timeout periods are increased when it is more likely that a request will be received, thus increasing performance. The switching of an electronic device between these phases ensures that a proper balance between power savings and performance is reached.

The electronic system (100) may also include an electronic device control engine (110) to instruct the electronic device to enter a low power mode based on the expiration of a timeout period associated with the activity phase. For example as described above, each activity phase has a corresponding timeout period, at the expiration of which, the electronic device is instructed, either by a remote device or internal circuitry, to enter a low power mode. Accordingly, an electronic device in a busiest activity phase, that has been idle for an amount of time at least as great as a timeout period associated with the busiest activity phase, may be put in a low power mode. Still further, in the event that an activity phase is switched, the electronic device control engine (110) may also instruct the electronic device to enter a second low power mode based on the expiration of a second timeout period associated with the second (i.e., switched to) activity phase.

An electronic system (100) to maintain various activity phases with corresponding timeout periods and to select a particular activity phase and corresponding timeout period for a particular electronic device based on the usage of the electronic device may achieve more energy savings with less user inconvenience by balancing between energy efficiency and performance. This enhanced balance may be achieved by the adaptive and dynamic power management system inside the electronic system (100).

FIG. 2 is a flowchart of a method (200) for managing power of an electronic device, according to one example of the principles described herein. As a general note, the methods (200, 500) may be described below as being executed or performed by at least one device, for example, the electronic system (FIG. 1, 100). Other suitable systems and/or computing devices may be used as well. The methods (200, 500) may be implemented in the form of executable instructions stored on at least one machine-readable storage medium of at least one of the devices and executed by at least one processor (FIG. 1, 102) of at least one of the devices. Alternatively or in addition, the methods (200, 500) may be implemented in the form of electronic circuitry (e.g., hardware). While FIGS. 2 and 5 depict operations occurring in a particular order, a number of the operations of the methods (200, 500) may be executed concurrently or in a different order than shown in FIGS. 2 and 5. In some examples, the methods (200, 500) may include more or less operations than are shown in FIGS. 2 and 5. In some examples, a number of the operations of the methods (200, 500) may, at certain times, be ongoing and/or may repeat.

The method (200) may include obtaining (block 201) usage data for an electronic device. For example, an electronic device may be a laser printer and usage data may indicate who uses the laser printer, how often a laser printer is used, how often requests to use the laser printer are received, and the use of the laser printer on an hourly, daily, and weekly basis, as well as usage of the laser printer on holidays.

The method (200) also includes selecting (block 202) an activity phase from a plurality of activity phases for the electronic device. In other words, from a set of activity phases, the method (200) includes selecting (block 202) one of the activity phases and associating the electronic device with that activity phase. As described above, each activity phase has a corresponding timeout period such that when in the activity phase, an electronic device that remains idle for a period of time at least as great as that timeout period may be placed in a low power mode. A specific numeric example is given as follows. In this example, the electronic device is in a busiest activity phase with a timeout period of 10 seconds, meaning that if an electronic device is idle for more than 10 seconds, that electronic device is placed in a low power mode. The different activity phases are indicative of different loads on the electronic device. For example, an electronic device in a busiest activity phase may receive more requests for operation during a given period of time than the same electronic device in a less busy activity phase. Activity phase timeout periods may be longer based on an increased load indicated by the phase. For example, a busiest activity phase may have a longer timeout period than a less busy activity phase to maintain responsiveness by not entering a low power mode, during periods of time when more requests are likely to be received, i.e., a busier time period.

A timeout period for an associated activity phase may be calculated based on a number of selection criteria. Examples of such selection criteria include, a time of the day, a day of the week, whether the particular time period falls on a holiday, a number of activity phases, and a desired power consumption level. For example, during a weekend, an electronic device may be used less often, and as such a shorter time period may be implemented. Still further, during a holiday, and after-hours, an electronic device may be similarly utilized less and as such may have a shorter timeout period. As yet another example, during peak hours, more granularity of the management strategy may be implemented by increasing the number of activity phases and the corresponding number of timeout periods. The selection of a timeout period may provide a reduced power consumption given a wakeup delay constraint.

The wakeup delay constraint may refer to a maximum delay allowable for the electronic device. For example, a wakeup delay constraint may be a user-input value indicating a maximum time period that the user is willing to wait for a function to be executed. With specific reference to a laser printer, the wakeup delay constraint may be the maximum amount of time a user is willing to wait after a print job is sent for the print job to be printed by the laser printer. As the criteria for selection of a timeout period may change, i.e., change in day, change in time of day, the timeout selection criteria may be dynamic, meaning it can change with respect to time. In some examples, such change may be made without user interaction.

An activity phase for an electronic device may be selected (block 202) based on an inter-arrival threshold for the activity phases. For example, each activity phase may have upper and lower bound inter-arrival thresholds. If an inter-arrival value for an electronic device falls between the upper and lower bond thresholds for a particular activity phase, the electronic device may be said to be in that particular activity phase. A specific numeric example is given as follows. In this example, an intermediate activity phase may have an upper bound inter-arrival threshold of 45 seconds and a lower bound inter-arrival threshold of 30 seconds, meaning that requests for use of an electronic device in this phase are received within 30-45 seconds of one another. If the usage data of the electronic device indicates that the actual inter-arrival values for the electronic device are between 30-45 seconds of one another, the electronic device is said to be in the intermediate activity phase.

The inter-arrival thresholds for a particular activity phase may be calculated based on a number of selection criteria. Examples of such selection criteria include, time of day, day of the week, whether the particular time period falls on a holiday, the number of activity phases, and a desired power consumption level. For example, during a weekend, an electronic device may be used less often, and as such the inter-arrival thresholds may be larger as compared to when the electronic device is used more often. Still further, during a holiday, and after-hours, an electronic device may be similarly utilized less and as such may have a longer inter-arrival threshold. As yet another example, during peak hours, an electronic device may be used more. To accommodate the higher usage, more tightly packed inter-arrival thresholds may be used, and a greater quantity of activity phases may be used. Similar to the timeout period, the inter-arrival thresholds may be selected to reduce power consumption. In one specific example, a selection criteria may be a wakeup delay constraint described above. As the criteria for selection of an inter-arrival threshold may change, due to a change in day or a change in time of day, the timeout selection criteria may be dynamic, meaning it can change with respect to time. In some examples, such change may be made without user interaction.

In these examples, the wakeup delay constraint may be dynamic and may vary with time. For example, the wakeup delay constraint may be a larger value during weekends, holidays, and other off-hours when the electronic device is not used as heavily and can afford to have a longer maximum delay. In other words, the wakeup delay constraint may be calculated based on a period of time.

The method (200) may include instructing (block 203) the electronic device to enter a low power mode after being inactive, or idle, for a time period at least as great as the timeout period corresponding to a selected activity phase. For example, if the electronic device is in an intermediate activity phase, which activity phase has a timeout period of one minute, if the electronic device remains idle for at least one minute, the electronic device may be placed in a low power mode.

In some examples, instructing (block 203) the electronic device to enter a low power mode may include instructing the electronic device to enter one of a plurality of low power modes. For example, an electronic device may have multiple low power modes defined. Examples of these multiple low power modes may include a power off mode, a ready mode, a shallow suspend mode, a suspend mode, and a deep suspend mode. Accordingly, the activity phase may define which of a power off mode, a shallow suspend mode, a suspend mode, and a deep suspend mode, the electronic device should enter.

Figure 3:
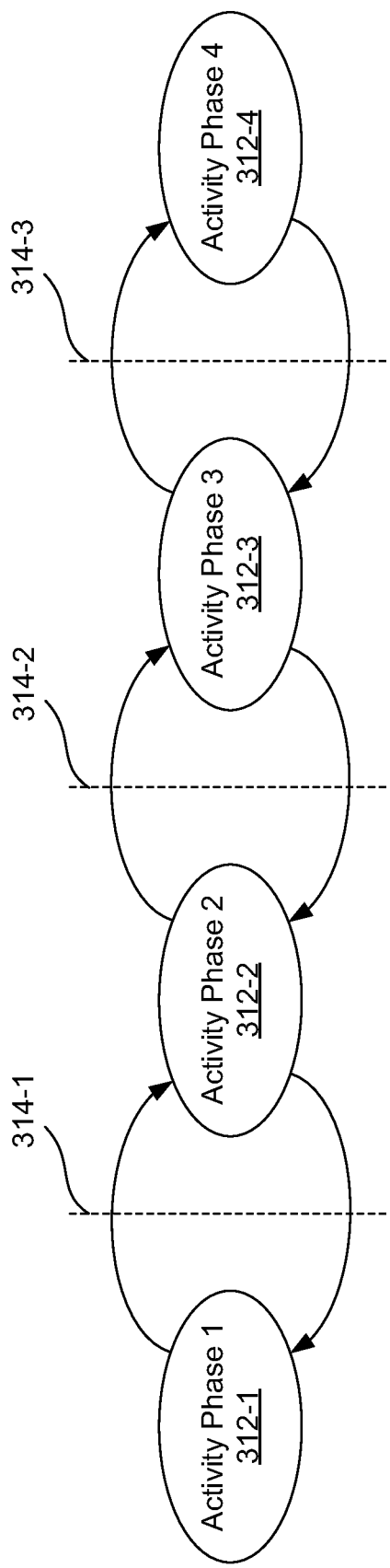
FIG. 3 is a diagram of multiple activity phases for an electronic device, according to another example of the principles described herein.

FIG. 3 is a diagram of multiple activity phases (312) for an electronic device, according to another example of the principles described herein. As described above, an electronic device may be placed in a number of activity phases (312) that may be classified based on the load, or how busy, the electronic device is when in that particular phase. For example, an electronic device in a busiest activity phase (312-1) may be busier than when that same electronic device is in a least busy activity phase (312-4). While four activity phases (312-1, 312-2, 312-3, 312-4) are depicted in FIG. 3, an electronic device may have any number of activity phases (312), which may or may not be activated for a given period of time. During use, the electronic system (FIG. 1, 100) may include a receive engine (FIG. 1, 106) that continually monitors the usage data of the electronic device and is continually changing the activity phase (312) associated with the electronic device based on the usage data. For example, the electronic device may be instructed to move to a next more busy phase, the next less busy phase, or to stay at the same phase.

The transition between neighboring phases is controlled by a number of inter-arrival thresholds (314-1, 314-2, 314-3). For example, an electronic device may transfer from a busiest activity phase (312-1) to a next less busy phase (312-2) when the actual inter-arrival values for the electronic device are greater than an upper bound inter-arrival threshold (314-1) for the busiest activity phase (312-1). Similarly, an electronic device may transfer from the next less busy phase (312-2) to the busiest activity phase (312-1) when the actual inter-arrival values for the electronic device are less than the lower bound inter-arrival threshold (314-1) for the next busiest activity phase (312-2). As described above, the inter-arrival thresholds (314) may be calculated to provide a minimum power consumption given a wakeup delay constraint. When compared to other strategies, the multi-phase power management strategy may improve energy consumption while maintaining performance as a finer granularity of timeout periods allows for entry of a low power mode that is catered to the particular electronic device usage for a specific period of time.

Figure 4:
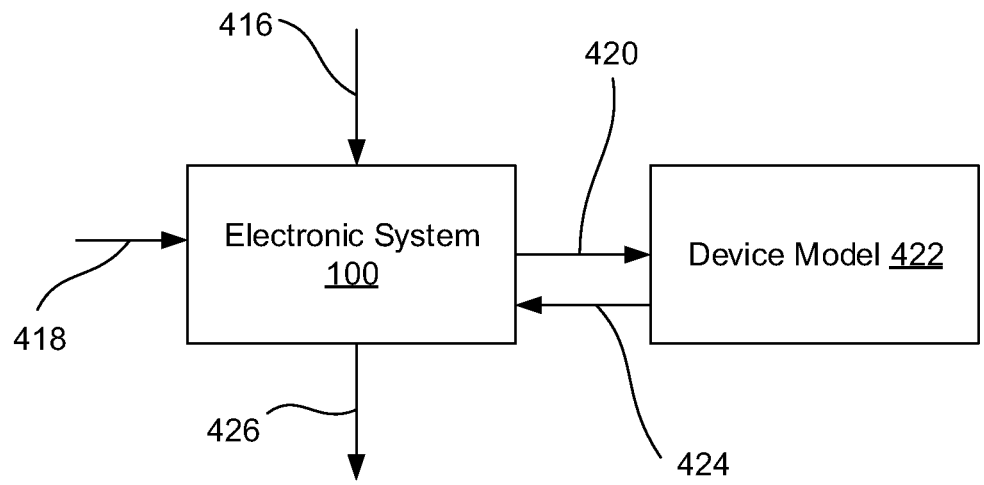
FIG. 4 is a diagram of a system for managing power of an electronic device, according to one example of the principles described herein.

FIG. 4 is a diagram of an electronic system (100) for managing power of an electronic device, according to one example of the principles described herein. As described above, the electronic system (100), relying on usage data (418) of the electronic device and an input (416) such as a wakeup delay constraint, may determine an output (426) that indicates the timeout periods and inter-arrival thresholds for the various activity phases (FIG. 3, 312). For example, the electronic system (100) may receive usage data (418) in the form of a printer activity log and may also receive an input (416) such as a user input of a wakeup delay constraint of less than 3 seconds. Using this information, the electronic system (100) may pass a number of candidate (420) timeout periods to a device model (422). The device model (422) may include parameters of the electronic device to simulate the effect that the candidate (420) timeout periods and inter-arrival thresholds will have on the power consumption and wakeup delay. Examples of such parameters that may be represented by the device model (422) include transition time, wakeup energy, average idle power and average sleeping power, among other characteristics of the electronic device.

The device model (422) evaluates the effect of the candidate (420) timeout periods and inter-arrival thresholds on power consumption and passes back an average power consumption value (424) indicating an average power consumption for the electronic device given the candidate (420) timeout period and inter-arrival threshold. The electronic system (100) then processes and selects the most efficient candidate (420) timeout period and inter-arrival thresholds based on the average power consumption value (424) and outputs (426) the timeouts and thresholds to be applied to the electronic device. As described above, as the criteria for selecting a candidate (420) timeout period and inter-arrival threshold may change, the electronic system (100) may continually monitor and adjust the candidate (420) values as well as the output (426) values.

FIG. 5 is a flowchart of a method (500) for managing power of an electronic device, according to another example of the principles described herein. The method (500) may include obtaining (block 501) usage data for an electronic device. This may be performed as described above in connection with FIG. 2. The method (500) may include selecting (block 502) an activity phase (FIG. 3, 312) from a plurality of activity phases (FIG. 3, 312) for the electronic device based on the usage data. This may be performed as described in connection with FIG. 2. The method (500) may include instructing (block 503) the electronic device to enter a low power mode after being inactive for a time period at least as great as a timeout period corresponding to the selected activity phase (FIG. 3, 312). This may be performed as described in connection with FIG. 2.

The method (500) may include switching (block 504) the selected activity phase (FIG. 3, 312) based on changes to the usage data. For example, as the actual inter-arrival values for an electronic device either increase or decrease so as to be greater than or less than a closest inter-arrival threshold (FIG. 3, 314), the electronic device may be associated with a different activity phase (FIG. 3, 312). Accordingly, the method (500) may include instructing (block 505) the electronic device to enter the low power mode after being inactive for a period of time at least as great as the timeout period corresponding to the switched-to activity phase (FIG. 3, 312). In a specific example, an electronic device may be in busiest activity phase (FIG. 3, 312-1) with a timeout period of 1 minute and an upper bound inter-arrival threshold of 45 seconds. Once the inter-arrival values of the electronic device change such that requests are received with an inter-arrival value of greater than 45 seconds, the electronic device may switch to a next less busy phase (FIG. 3, 312) having a timeout period of 30 seconds and an upper bound inter-arrival threshold of 1 minute. In this example, the electronic device may be put in a low power mode after being idle for more than 30 seconds, which 30 second time corresponds to the timeout period of the next less busy activity phase (FIG. 3, 312-2) to which the electronic device switched to. As can be seen from this example, the multi-phase dynamic power management strategy may, for example, afford greater flexibility in tailoring a power management strategy to the needs of the user as measured by response time while enhancing the energy consumption characteristics of the electronic device.

Figure 6:
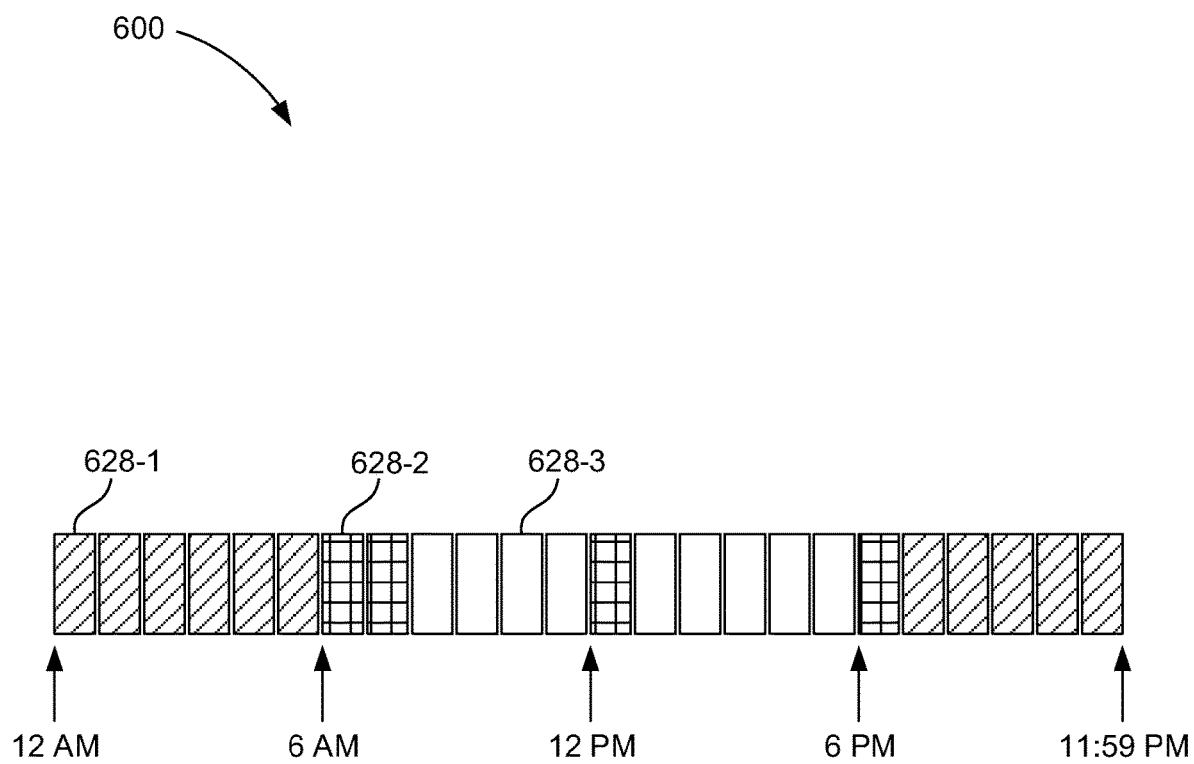
FIG. 6 is a diagram of a power management schedule for an electronic device, according to one example of the principles described herein.

FIG. 6 is a diagram of a power management schedule (600) for an electronic device, according to one example of the principles described herein. As the electronic device usage may have distinct activities and usages across days of the weeks and even hours of the day, a single timeout period and threshold for defining the activity phases may be less efficient in balancing power and delay. Accordingly, the multi-phase power management system provides a variable set of activity phases (FIG. 3, 312) each with distinct timeout periods. The different activity phases (FIG. 3, 312) may address the inherent fluctuation in electronic device usage behavior. FIG. 6 is a diagram of a schedule (600) that may be implemented for an electronic device. The schedule (600) indicates how the variable set of activity phases differs throughout the day. In other words, as described above, one or more of the timeout period, inter-arrival thresholds, and wakeup constraint may vary with time. Accordingly, the set of activity phases (FIG. 3, 312) may vary with respect to time. In other words, the variable set of activity phases for different points of the schedule may also differ. For example, during peak hours (628-3), the variable set of activity phases (FIG. 3, 312) may include four activity phases with a wakeup delay constraint of 2.5 seconds. By comparison, during transition hours (628-2), the variable set of activity phases (FIG. 3, 312) may include two activity phases (FIG. 3, 312) with a wakeup delay constraint of 4 seconds. Still further, during off-hours (628-1), the variable set of activity phases (FIG. 3, 312) may include two activity phases (FIG. 3, 312) with a wakeup delay constraint of 5 seconds. For simplicity, one instance of each of peak hours (628-3), transition hours (628-2), and off-hours (628-1) are indicated with a reference number, however, hours with similar fills represent similar types of hours.

Figure 7:
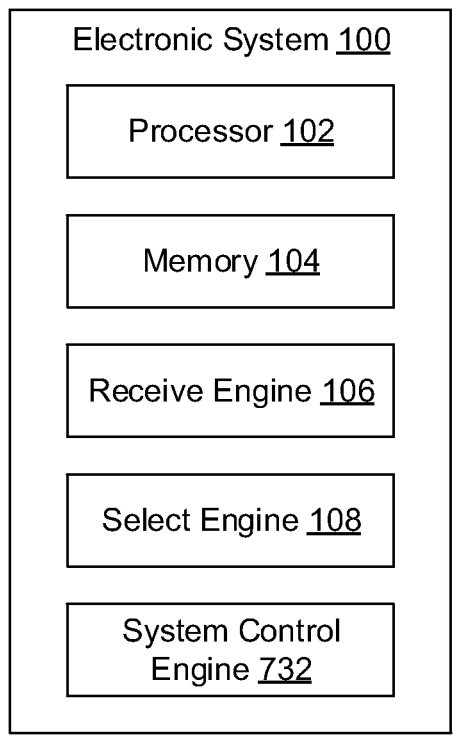
FIG. 7 is a diagram of a system for managing power of an electronic device, according to another example of the principles described herein.

FIG. 7 is a diagram of an electronic system (100) for managing power of an electronic device, according to another example of the principles described herein. The electronic system (100) may include a processor (102) and a machine-readable storage medium (104) communicatively coupled to the processor (102). The electronic device (100) may also include a receive engine (106) to obtain usage data for the electronic device. The electronic device (100) may also include a select engine (108) to select from a set of candidate power management policies for the electronic device, a power management policy to be applied to the device.

More specifically, in managing the power consumption of an electronic device, a number of power management strategies may be applied. For example, in a static timeout based policy, an electronic device in an idle state is taken to a low power mode after the expiration of a timeout period. In a static timeout based policy, a single timeout period may be used for the electronic device regardless of the activity of the electronic device. By comparison, a multi-phase policy may utilize multiple timeout periods, each corresponding to a different activity phase (FIG. 3, 312). In an adaptive timeout based policy, the timeout period for the electronic device may be selected based on a prediction of a next arrival time of a request. Another example of a power management policy is a predictive policy which, relying on past usage patterns predicts an electronic device's predicted future usage. Such prediction is based on observed patterns, exponential averages, correlations, regression or heuristics of past observed and predicted idle times. The candidate set of policies may include any of the above described policies. For example, the candidate power management policies may include at least one of a fixed timeout policy, an adaptive timeout policy, a predictive timeout policy, and an adaptive multi-phase policy.

While many power management policies exist, due to the fluctuating behavior of electronic device usage a single policy may not optimize the efficiency, in terms of performance and power consumption, of an electronic device. For example, for frequent uses during peak hours, the best power management strategy may be a long timeout period, which prevents the electronic device from entering a low power mode thus reducing the wake up power consumption and wake up delay. By comparison, for less frequent uses as encountered during weekends or non-working hours, shutting down the electronic device immediately after executing an operation saves energy. Accordingly, the select engine (108) may evaluate a number of candidate policies and may select, as the applied policy, the policy that strikes a desired balance between power consumption and performance. The balance may be based on delay constraints, power consumption values, desired power consumption values, and periods of time, among other balancing factors. Such a selection of a particular strategy may provide better energy savings than relying on a single policy.

In some examples, the select engine (108) may evaluate the set of candidate power management policies during an evaluation period. Following the evaluation period, the selected power management policy may be applied during a freeze period. During this freeze period, the select engine (108) is inactive, meaning that it is not actively evaluating candidate power management policies. At the expiration of the freeze period, the select engine (108) re-evaluates the set of candidate power management policies to determine a second, and perhaps different, power management policy to apply to the electronic device. The evaluation period and the freeze period may be selected to reduce the overall power consumption of the electronic device. For example, frequent evaluations followed by short freeze periods may provide better energy consumption results for the electronic device.

The electronic system (100) includes a system control engine (732) to instruct the electronic device to enter a low power mode based on the selected power management policy. For example, if a static fixed timeout policy is selected, the system control engine (732) may instruct the electronic device to enter a low power mode based on the static timeout period indicated by the static fixed timeout policy. By comparison, if an adaptive multi-phase policy is selected, the system control engine (732) may implement the select engine (108) described in connection with FIG. 1 to determine an activity phase (FIG. 3, 312) of the electronic device and instruct the electronic device to enter a low power mode at the expiration of a corresponding timeout period of the selected activity phase. An electronic device that implements an adaptive multi-phase strategy and a strategy selection from amongst a candidate set of policies may improve energy efficiency while maintaining electronic device performance.

For example, using a generic printer connected to a power meter, energy consumption measurements and wakeup delay measurements were taken when using the different power management strategies. When compared against other power management strategies the candidate selection strategy has increased performance. For example, a fixed timeout period is inefficient in balancing delay and power consumption. An immediate sleep policy and a 1 minute time out policy shut down the electronic device often causing an increased delay. Still further a 30 minute timeout rarely shuts down and can service a request immediately; however, an electronic device implementing such a policy consumes much power. Using a candidate selection policy may allow for selection of a power management policy that is best for an electronic device under particular circumstances, thus ensuring an efficient power management strategy is implemented in an electronic device.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the machine-readable program code, when executed via, for example, the processor (FIG. 1, 102) of the computing system or other programmable data processing apparatus, implement the functions or acts specified in the flowchart and/or block diagram block or blocks. In one example, the computer usable program code may be embodied within a machine-readable storage medium; the machine-readable storage medium being part of the computer program product. In one example, the machine-readable storage medium is a non-transitory machine-readable medium.

Certain examples of the present disclosure are directed to a device and method for managing power of an electronic device that allows for 1) an optimized balance between power consumption and immediate availability; 2) finer granularity and greater flexibility in tailoring a power management strategy; 3) cost efficiency in operating an electronic device; and 4) responsible energy consumption in operating an electronic device. However, it is contemplated that the devices disclosed herein may prove useful in addressing other matters and deficiencies in a number of technical areas. Therefore the systems and methods disclosed herein should not be construed as addressing any of the particular matters.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method comprising:
obtaining usage data for an electronic device;
periodically selecting a current set of activity phases from a plurality of activity phases based on a number of selection criteria;

selecting a current activity phase from the current set of activity phases for the electronic device based on the usage data, each activity phase having:
a corresponding timeout period; and
is a lower inter-arrival threshold and an upper inter-arrival threshold;
instructing the electronic device to enter a low power mode after being inactive for a time period greater than the timeout period corresponding to the current activity phase;
upon arrival of a request for the electronic device, and in response to determining that an arrival time that has elapsed since arrival of a prior request for the electronic device is less than the lower inter-arrival threshold for the current activity phase,
selecting a new activity phase from the current set of activity phases having a corresponding timeout period less than the corresponding timeout period of the current activity phase, to replace the current activity phase.

2. The method of claim 1, further comprising:
switching the current activity phase based on changes to the usage data; and
instructing the electronic device to enter the low power mode after being inactive for a period of time greater than the timeout period corresponding to a switched activity phase.

3. The method of claim 1, wherein each of the lower and upper inter-arrival thresholds for each activity phase:
is dynamic; and
is calculated based on the number of selection criteria.

4. The method of claim 1, wherein the timeout period corresponding to each activity phase:
is dynamic; and
is calculated based on the number of selection criteria.

5. The method of claim 1, wherein the timeout period for each activity phase is calculated based on a wakeup constraint specified by a user and corresponding to a maximum length of time that the user is willing to wait for the electronic device to exit the low power mode.

6. The method of claim 5, wherein the wakeup constraint:
is dynamic; and
is calculated based on a period of time.

7. The method of claim 1, wherein instructing the electronic device to enter a low power mode comprises instructing the electronic device to enter one of multiple low power modes, the one of multiple low power modes being selected based on the current activity phase.

8. The method of claim 1, wherein:
an activity phase is indicative of a load through the electronic device; and
an activity phase indicating a greater load has a longer timeout period than an activity phase indicating a lesser load.

9. The method of claim 1, further comprising:
upon arrival of the request for the electronic device, and in response to determining that the arrival time is greater than the upper inter-arrival threshold for the current activity phase,
selecting the new activity phase from the current set of activity phases having a corresponding timeout period greater than the corresponding timeout period of the current activity phase, to replace the current activity phase.

10. The method of claim 1, wherein periodically selecting the current set of activity phases from the plurality of activity phases based on the number of selection criteria comprises selecting the current set of activity phases from the plurality of activity phases according to a schedule, such the current set of activity phases differs based on the schedule.

11. A system comprising:
a processor;
memory communicatively coupled to the processor;
a receive engine to obtain usage data for an electronic device;
a select engine to:
periodically select a current set of activity phases from a plurality of activity phases based on a number of selection criteria;
dynamically select from the current set of activity phases a current activity phase to associate with the electronic device by comparing the usage data to inter-arrival thresholds for multiple activity phases of the variable set of activity phases, wherein:
each activity phase has a corresponding timeout period, a lower inter-arrival threshold and an upper inter-arrival threshold;
the activity phases are defined by a load; and
a timeout period for an activity phase defined by a heavier load is longer than a timeout period for an activity phase defined by a lighter load; and
upon arrival of a request for the electronic device, and in response to determining that an arrival time that has elapsed since arrival of a prior request for the electronic device is less than the lower inter-arrival threshold for the current activity phase,
select a new activity phase from the variable set of activity phases having a corresponding timeout period less than the corresponding timeout period of the current activity phase, to replace the current activity phase; and
an electronic device control engine to:
instruct the electronic device to enter a power mode based on an expiration of a timeout period associated with the current activity phase.

12. The system of claim 11, wherein the variable set of activity phases varies with respect to the timeout periods for the activity phases in the current set, the lower and upper inter-arrival thresholds for the activity phases in the current set, or a number of the activity phases in the current set.

13. The system of claim 11, wherein the select engine is further to:
upon arrival of the request for the electronic device, and in response to determining that the arrival time is greater than the upper inter-arrival threshold for the current activity phase,
select the new activity phase from the current set of activity phases having a corresponding timeout period greater than the corresponding timeout period of the current activity phase, to replace the current activity phase.

14. The system of claim 11, wherein the timeout period for each activity phase is calculated based on a wakeup constraint specified by a user and corresponding to a maximum length of time that the user is willing to wait for the electronic device to exit the low power mode.

15. A system comprising:
a processor;
memory communicatively coupled to the processor;
a receive engine to obtain usage data for an electronic device;
a select engine to:

periodically select a current set of activity phases from a plurality of activity phases based on a number of selection criteria;

select a current activity phase for the electronic device from the current set of activity phases, the current activity phase having a corresponding timeout period, a lower inter-arrival threshold, and an upper inter-arrival threshold; and upon arrival of a request for the electronic device, and in response to determining that an arrival time has elapsed since arrival of a prior request for the electronic device is less than the lower inter-arrival threshold for the current activity phase, select a new activity phase from the current set of activity phases having a corresponding time period less than the corresponding timeout period of the current activity phase, to replace the current activity phase; and a system control engine to instruct the electronic device to enter a low power mode based on the current activity phase.

16. The system of claim 15, wherein the lower and upper inter-arrival thresholds for the current activity phase are dynamic and is calculated based on the number of selection criteria.

17. The system of claim 16, wherein the corresponding timeout period of the current activity phase is dynamic and is calculated based on the number of selection criteria.

18. The system of claim 16, wherein the timeout period and for the current activity phase is calculated based on a wakeup constraint specified by a user and corresponding to a maximum length of time that the user is willing to wait for the electronic device to exit the low power mode.

19. The system of claim 16, wherein the wakeup constraint is dynamic and is calculated based on a period of time.

20. The system of claim 15, wherein the select engine is further to:

upon arrival of the request for the electronic device, and in response to determining that the arrival time is greater than the upper inter-arrival threshold for the current activity phase, select the new activity phase from the current set of activity phases having a corresponding timeout period greater than the corresponding timeout period of the current activity phase, to replace the current activity phase.

* * * * *